United States Patent Office 3,149,468
Patented Sept. 22, 1964

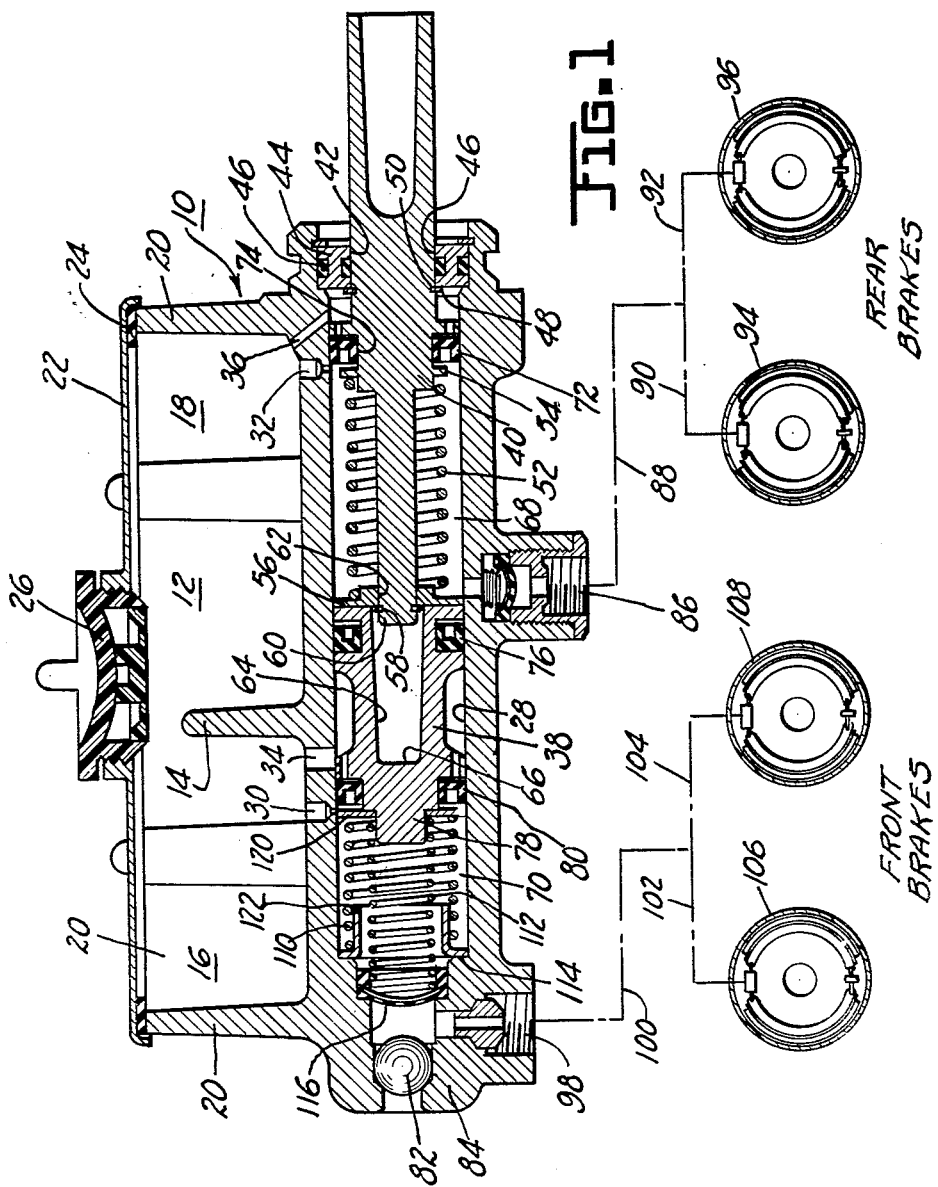

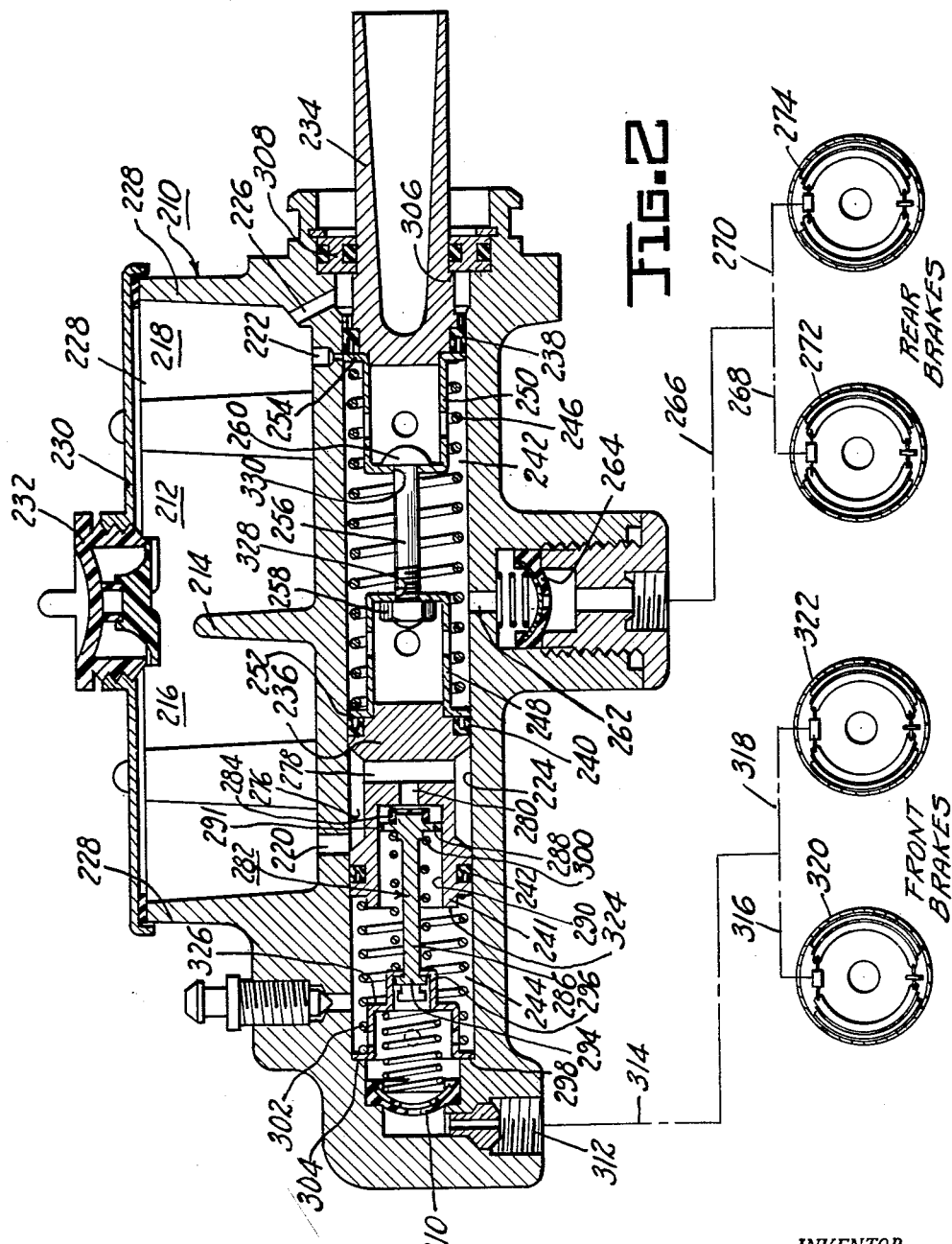

3,149,468
SPLIT SYSTEM MASTER CYLINDER
Paul B. Shutt, St. Joseph, Mich., assignor to The Bendix Corporation, South Bend, Ind., a corporation of Delaware
Filed Aug. 15, 1960, Ser. No. 49,765
11 Claims. (Cl. 60—54.6)

This invention relates to a master cylinder construction and more specifically to a master cylinder having distinct fluid connections to the front set of wheel brakes and the rear set of wheel brakes so that in the event of hydraulic failure of the hydraulic actuating system portion associated with either set of brakes, the other will function. This type of system is sometimes referred to by those skilled in the art as a "split hydraulic system" and the purpose of these systems is to achieve greater safety in vehicle operation; thus, should there occur a failure in any portion of the hydraulic operating system of the conventional master cylinder, the vehicle is not without effective braking through the hydraulic actuating system.

Split systems, while having an indisputable advantage over conventional systems in providing greater safety, have not been popularized because they tend to increase pedal travel requirements for applying the brake.

Another obstacle which has precluded adoption of "split systems" is that the front set of wheel brakes does a greater portion of the braking work that does the rear set of wheel brakes because of greater axle loading on the front axle as compared with the rear axle in the proportion of about 60–40. Split systems which ignore this fact detract from the efficiency of the actuating system and are among the reasons why split systems have not been adopted in the past.

A further reason why the "split system" has not been adopted universally is that the construction of the master cylinder is somewhat more specialized and previous constructions achieving the desired results have become unduly complicated and costly both to construct and to service.

Accordingly, it is one of the principal objects of the present invention to provide a split system master cylinder having no more than the usual pedal travel requirement for fully applying the brakes at both the front wheels and the rear wheels. Stated in other words, it is an object of the invention to reduce the pedal travel requirements heretofore found necessary in split systems so that the pedal travel will compare favorably with that found in the conventional master cylinder.

Another object of the invention is to achieve by means of simple, yet effective structure, means for communicating somewhat greater actuating pressure to the front set of wheel brakes than is communicated to the rear set of wheel brakes so that the different fluid pressures communicating to these separate and distinct brakes will be in a constant proportion providing for the different amounts of braking work that each is required to accomplish during the course of a stop.

A further object of the invention is to produce a split system master cylinder having all of the advantages cited for split systems in the way of safety and the like, and yet will not be so intricate in construction or in function as to add prohibitively to the cost of producing, assembling and servicing the system.

Other objects and features of the invention will become apparent from a consideration of the following description which proceeds with reference to the accompanying drawings, wherein:

FIGURE 1 is a section view of the master cylinder taken through the center of the master cylinder and illustrating the components of the master cylinder as they are in retracted or brake released position. Hydraulic line connections to the front set of wheel brakes and the rear set of wheel brakes are shown schematically; and FIGURE 2 is a sectional view taken through the center of a master cylinder constituting a second embodiment of the invention with the components of the master cylinder shown in retracted or brake released position. There is also shown schematically the fluid connections leading to the front set of wheel brakes and the rear set of wheel brakes similar to that shown in FIGURE 1.

Referring now to the embodiment shown in FIGURE 1, the master cylinder indicated generally by reference numeral 10 includes a reservoir 12 for containing hydraulic fluid, the reservoir 12 being divided by a partition 14 which separates the hydraulic fluid within the reservoir into two distinct compartments 16 and 18 which are segregated one from the other so that each can contain a full charge of hydraulic fluid although the other has been emptied by a hydraulic failure. The reservoir is defined by four surrounding walls 20, three of said walls being shown, and a cover plate 22 having a sealing gasket 24 suitably secured to the top of the walls 20 to confine the fluid against loss.

A master cylinder filler cap 26, of any convenient construction can be included, the function of the filler cap is to prevent fluid from splashing upwardly out of the reservoir but permitting free entry of air into the reservoir to prevent subatmospheric pressure from developing as fluid is withdrawn from the reservoir 12. Between the reservoir 12 and master cylinder bore 28 are two compensating ports 30 and 32 which are spaced to provide fluid access from compartments 16 and 18 respectively to the master cylinder bore 28. Each compartment 16, 18 is also provided with a breather opening, opening 34 for compartment 16, and opening 36 for compartment 18 so that fluid can pass freely between cylinder bore 28 and compartment 16, 18 to prevent vacuum formation rearwardly of the pressure-creating faces of plungers 38 and 40. The plunger 40 is slidably movable through an opening 42 in the closure member 44 which closes the open end of the master cylinder bore 28, there being two seals 46 to prevent fluid leakage through the opening 42 and across the outer diameter of the closure 44. A snap ring 48 fitted within a slot 50 of the plunger 40 defines the retracted position of the plunger 40. A helical spring 52 is compressed between a shoulder 54 formed integrally with the plunger and a collar spring retainer 56 held at the end of the plunger by a snap ring 58. The spring 52 is loaded by whatever preferred amount is indicated from the design of the master cylinder, the only requirement being that the spring 52 be of a spring rate and compressed by a sufficient amount to a predetermined preload, so that both plunger 40 and plunger 38 may be moved in unison. The plunger 38 is biased leftwardly by the caged spring 52 and the plunger 38 is held in engagement with the sleeve 56 to be moved by the plunger 40 through the caged spring 52.

The end 60 of the plunger is reduced in diameter and is reciprocable through opening 62 when the plunger 38 reaches its limit of leftward movement, the end of the plunger passing within the recess 64.

The two plungers 38 and 40 define two fluid chambers 68 and 70, the fluid chamber 68 being sealed at one end by seal 72 carried by shoulder 74 and at the other end by seal 76 carried by plunger 38. Chamber 70 at the advance end of 78 of plunger 38 is sealed by a face seal 80 carried by plunger 38 and by a ball seal 82 which closes the end 84 of the master cylinder. In chamber 68 is an outlet port 86 connecting with line 88 having branches 90 and 92 leading to the rear set of wheel brakes 94 and 96. The other chamber 70 is similarly provided with an outlet 98 connecting with outlet line 100 having branch lines 102 and 104 connecting with the front set of wheel brakes 106, 108. Brakes 94, 96, 106 and 108 are actuated by wheel cylinders and the brake construction and function being well known, forms no part of the present invention.

The plungers 38 and 40 are urged retractively by two concentric helical springs 110 and 112 which are compressed against the seats 114 and 116 at one end and against a washer 120 at the other end, the washer 120 being carried by plunger 38. The springs 110 and 112 act directly upon the plunger 38 urging it retractively and the retractive force of springs 110 and 112 is communicated through plunger 38 and caged spring 52 to the plunger 40 causing the plunger 40 to move retractively until snap ring 48 engages closure 44. Since the caged spring 52 is of greater spring preload than the two springs 110 and 112 combined then the two plungers 78 and 40 are fixed retractively at a position defined by engagement of snap ring 50 with the closure 44.

The seat or shoulder 114 has a bushing 112 which engages the washer 120 fixing the limit of protractile movement of plunger 38 (movement toward the left in FIGURE 1) and thereafter, plunger 40 will move relatively to the fixed plunger 38 against the resistance of caged spring 52 the end 60 of the plunger moving slidably through opening 62 through recess 64, there being sufficient relative movement of the plunger 40 through the recess 64 before bottoming on 66 to provide adequate pressurizing of fluid within chamber 68 to fully apply the rear wheel brakes 94 and 96.

In operation, when it is desired to apply the brakes, the operator, through a convenient pedal or the like (not shown) communicates input force to the plunger 40 at its right hand end in FIGURE 1 causing the plunger 40 to move leftwardly and the input force acts through caged spring 52 to impart applying effort on plunger 38, both of the plungers 38 and 40 moving in unison to the left. Since the two plungers 38 and 40 move in unison then the sealing members 72 and 80 cover the compensating ports 30 and 32 simultaneously severing communication of chambers 70 and 68 with compartments 16 and 18 respectively and allowing build-up of pressure in the chambers. Assuming that there is no hydraulic failure in any portion of the system, the fluid pressure which builds up in chambers 68 and 70 is communicated through outlet lines 86 and 98 through lines 88 and 100 branch lines 90, 92, 102 and 104 to actuate the brakes 94, 96, 106 and 108. Since the caged spring 52 is of a higher preload than the combined rates of springs 110 and 112 the pressure in chamber 70 will be slightly in excess of that in chamber 68 by an amount which equals the differential of the spring rates and the higher pressure in chamber 70 is available to apply the front wheel brakes to a greater extent than the rear wheel brakes which, as explained previously, is desirable because the front wheel brakes do a proportionately greater amount of the work in stopping the vehicle. Because the compensating ports 30 and 32 are both closed simultaneously, there is no loss of brake pedal by virtue of the fact that there are two compensating ports and two seals and because there is no cumulative pedal travel required for covering both compensating ports than the pedal travel requirement for the split system master cylinder is substantially the same as that of a conventional master cylinder.

Assuming that there is hydraulic failure in the fluid system associated with the front wheel brakes, during brake application pressure will not develop in chamber 70 and input force communicated to the plunger 40 will cause both plungers 38 and 40 to move leftwardly until the plungers 38 is held against further movement by engagement of bushing 122 with washer 120 and thereafter movement of the operator's pedal will effect movement of the plunger 40 leftwardly relatively to the plunger 38 and against the resistance of caged spring 52 to develop hydraulic pressure in chamber 68, which pressure is communicated through outlet 86, line 88, branch lines 90, 92 to apply brakes 94 and 96. Even though fluid has drained completely from compartment 16, the partition 14 insures that sufficient fluid is present in compartment 18 to meet the hydraulic requirements for actuating the rear wheel brakes. Thus, in spite of the fact that there is malfunctioning of a portion of the system, the vehicle is not entirely without brakes since the rear wheel brakes are in no way affected by failure to develop hydraulic pressure in the actuating system provided for the front wheel brakes.

Assuming next that the rear wheel brakes have become inoperative, then no hydraulic pressure will be developed in chamber 68 when the operator is applying effort producing leftward movement of the plunger 40. Input effort developed on the plunger 40 will be communicated through the caged spring 52 to the plunger 38 and the plunger 38 will be biased leftwardly to develop pressure in chamber 70 which pressure is communicated through outlet 98 to hydraulic line 100 thence to branch lines 102 and 104 to actuate brakes 106 and 108. Typically the two springs 110 and 112 have spring rates for three pounds per inch apiece and the spring rate of spring 52 is about twelve pounds per inch so that enough force can be communicated through the caged spring to build up pressure in chamber 70 to obtain satisfactory stopping power from the front wheel brakes alone. Should all the hydraulic fluid be drained from compartment 18 there is sufficient brake fluid in compartment 16 to meet the fluid requirements of the front wheel brakes, and the system is so constructed that complete failure of the rear wheel brakes will not render the front wheel brakes inoperative.

Referring next to the embodiment shown in FIGURE 2, the master cylinder indicated generally by reference numeral 210 includes a reservoir 212 having a partition 214 which separates the reservoir into two compartments 216 and 218 just as in the previous embodiment. Compensating ports 220 and 222 communicate the respective compartments 216 and 218 with the master cylinder bore 224, there being a breather opening 226 in addition to the compensating port 222 for compartment 218.

The master cylinder reservoir is enclosed by walls 228, three of which are shown, and a cover plate 230 having a master cylinder filler cap 232 with the same function described for the filler cap in the previous embodiment.

Reciprocably mounted within the master cylinder bore 224 are two plungers 234 and 236, the plunger 234 having a seal 238 and plunger 236 having a seal 240 which define therebetween a fluid chamber 242. At the advance end 241 of the plunger 236 is a seal 242 which prevents fluid passage past the seal 242 from variable volume chamber 244. Between the two plungers 234 and 236 is a caged spring 246 which is compressed between two cup-shaped stampings 248 and 250 having turned back circular flanges 252 and 254 respectively. The two stampings are drawn closer together or are allowed to move further apart by means of a threaded stem 256 having a threaded end which receives nut 258 connecting with a stamping or spring retainer 248 and a rivet head 260 connecting with another stamping or spring retainer 250. Stampings 248 and 250 seat against the facing ends of the two plungers 234 and 236 and the amount of energy which is stored in the cage spring can be controlled by simply turning the nut 258 to advance it along the stem 256 or unscrewing it to lengthen the spring 246 and reduce the amount of stored energy therein. The chamber 242 has an outlet 262 leading to the brakes through a residual pressure check valve 264, line 266, branch lines 268 and 270 to the rear wheel brakes at 272 and 274 respectively. Details of the residual pressure check valve are found in Re. 24,664 issued June 30, 1959 "Residual Pressure Check Valve." The chamber 244 which communicates with the front wheel brakes is provided with fluid from compartment 216 through compensating port 220 a recess 276 in plunger 236, radial passage 278 and longitudinal passage 280. Communications through the passage 280 from the reservoir compartment 216 is controlled by a valve designated generally by reference numeral 282. The valve 282 has a resilient element 284 carried on the end of a stem 286 by means of a flange 288 which is piloted within an opening 290 of the plunger 236 and by-passes notches 291 to permit fluid to flow past the flange 288. At the opposite end of the stem is an abutment 294 which is held normally in engagement with the end 296 of a stepped diameter stamping 298. A coil spring 300 biases the stem 282 rightwardly fixing the spatial location of the sealing element 284 which location is normally out of engagement with 280 so that fluid can pass from the compartment 216 to chamber 244 unimpeded. A return spring 302 bearing at one end against the closed end 304 of the master cylinder and at its other end against plunger 236 biases the plunger 236 toward the right or in a retracting direction and the force of spring 302 is communicated through the caged spring 246 to the plunger 234 which is also retracted until shoulder 306 engages closure member 308 to define the retracted positions for the two plungers wherein sealing member 238 just uncovers compensating port 222 and sealing element 284 is out of engagement with the passage 280.

Fluid pressure from chamber 244 is communicated through a residual pressure check valve 310 to an outlet 312 thence to an outlet line 314 and branch lines 316, 318 connecting with the front set of wheel brakes 320 and 322.

In operation, assuming that no malfunctioning is present in any portion of the system, input force communicated to the plunger 234 causes it to move leftwardly thereby developing a fluid pressure in chamber 242 and leftward movement of the plunger 234 is communicated through the caged spring 246 to plunger 236 simultaneously developing fluid pressure in chamber 244 communicating with the front wheel brakes. Brake pressure cannot develop in either chamber 242 or in chamber 244 until seal 238 is moved past compensating port 222 and sealing element 284 has moved into engagement with passage 280; but since both of these events occur simultaneously, no additional pedal travel movement is required over and above that needed in a conventional master cylinder.

The pressure in chamber 244 assisted by spring 302 is balanced against the combination of pressure in chamber 242 and the force of caged spring 246, and since the preload of caged spring is greater than spring 302 the fluid pressure in chamber 244 is greater than that in chamber 242 and thus greater applying force is communicated to the front wheel brakes than is communicated to the rear wheel brakes. The difference in applying pressure effects greater applying force for the front wheel brakes and this is a desirable condition since the front wheel brakes, as previously described, do a greater portion of the braking work in stopping the vehicle. While the two plungers 234 and 236 are moving leftwardly the passage 280 which is sealed off by sealing element 242 continues to be sealed because the stem 282 also moves leftwardly with the plunger 236, movement being indicated by the dotted line position on the end of the stem to which the stem is moved by the plunger 236.

Assuming that hydraulic failure has occurred in the rear set of wheel brakes, actuating movement of the plunger 234 will fail to develop any pressure in chamber 242 and applying effort on the plunger 234 will communicate through the caged spring 246 an applying force on plunger 236 effecting its leftward movement to develop fluid pressure in chamber 244 which is communicated to front wheel brakes 320 and 322. Sealing of passage 280 by the sealing element 284 is in no way affected by failure of the hydraulic system associated with the rear wheel brakes. Even assuming that all of the brake fluid has been drained from compartment 218, the fluid in compartment 216 is segregated from compartment 218 and has sufficient volumetric capacity to meet the requirements for the front wheel brakes. Thus, in spite of complete failure of the hydraulic system for actuating the rear wheel brakes the front wheel brakes remain inoperative.

Assuming next that the hydraulic system for the front wheel brakes has failed, then input force on the plunger 234 is communicated through the caged spring 246 to the plunger 236 and there is no build-up of pressure in chamber 244. Therefore both plungers 234 and 236 move leftwardly unimpeded until the plunger 236 bottoms at its end 324 on shoulder 326 of member 298 and thereafter the plunger 234 will move leftwardly against the resistance of the caged spring 246, the stem 256 sliding through openings 328 and 330 of stampings 248 and 250 to effect build-up of fluid pressure in chamber 242 which is communicated as applying effort to the rear wheel brakes. Thus, in splite of complete failure of the hydraulic system associated with the front wheel brakes, and for that matter complete draingage of the hydraulic fluid compartment 216, the rear wheel brakes remain operative and the fluid in compartment 218 is not lost but is sufficient to meet the actuating requirements for the rear wheel brakes.

Although this invention has been illustarted and described in connection with only two example embodiments it will be understood that these are only illustrative of the invention and are not restrictive of the invention. It is reasonable to expect that those skilled in the art can make numerous adaptations and revisions of the invention as suit particular design requirements and it is intended that such revisions and adaptations as incorporate the herein disclosed principles will be included within the scope of the following claims as equivalents of the claimed invention.

What is claimed is:

1. In a master cylinder construction: a pair of reservoir means segregated from each other, a cylinder bore, a first plunger slidingly and sealingly engaging the wall of one end portion of said bore, a second plunger slidingly and sealingly engaging the wall of the other end portion of said bore and disposed at the advanced end of said first plunger and spaced therefrom to define a first fluid chamber, said first fluid chamber having outlet port means, said second plunger and said other end portion of said bore defining a second fluid chamber, said second fluid chamber having outlet port means, said fluid chambers each having a compensating port communicating with a respective one of said reservoir means, said plungers each having an end surface facing each other, an elongated member operatively connected at one end to one of said plungers and extending away from said end surface of said one plunger toward the end surface of the other of said plungers, an abutment on the other end of said elongated member, a spring retainer having an opening therein slidably receiving said elongated member therethrough, said spring retainer having at least a portion immediately adjacent said opening and located axially between said abutment and said end surface of said one plunger, a first coil spring surrounding said elongated member and compressed between said end surface of said one plunger and said spring retainer with one end of said spring being operatively connected to said one plunger and the other end of said spring engaging one face of said retainer to urge the portion on the other face of said retainer which is immediately adjacent said opening into engagement with said abutment, said end surface of said other plunger comprising an annular surface, said spring retainer terminating in an annular surface abutting said annular surface of said other plunger, said other plunger having an abutment surface aligned with and axially spaced from said other end of said elongated member and axially spaced from said annular surface of said other plunger for engagement by said elongated member when said first plunger has advanced axially a predetermined distance relative to said second plunger, a second coil spring of lesser spring preload than said first coil spring located in said second fluid chamber an acting on said second plunger for effecting engagement between said other plunger and said spring retainer and thus urge said plungers as a unit in a direction away from said other end portion toward said one end portion of said bore, stop means, said second coil spring further urging one of said plungers into engagement with said stop means whereby engagement thereof will define the retracted position of said plungers as a unit, and valve means for communicating each of said compensating ports with their respective reservoir means when said plungers are in retracted position and cutting-off said communication when said plungers are moved from their retracted position.

2. The structure as recited in claim 1 wherein said abutment surface of said other plunger is the closed end of a recess in said other plunger, which recess opens into said annular surface of said other plunger.

3. The structure as recited in claim 1 wherein said elongated member is integral with said one plunger, and said abutment is a snap ring located in a groove at said other end of said elongated member.

4. The structure as recited in claim 3 wherein said annular surface of said spring retainer is substantially co-planar with that portion of said retainer which engages said abutment, said abutment surface of said other plunger is the closed end of a recess in said other plunger, which recess opens into said annular surface of said other plunger.

5. The structure as recited in claim 4 wherein said stop means comprises a fixed annular seating member located at the rear of said bore, said first plunger has a flanged portion engaging said annular sealing member.

6. The structure as recited in claim 1 wherein said retainer is cup-shaped defining a cavity therein and terminates in an annular flange defining said annular surface of said retainer, said retainer opening is at the cupped end of said retainer, said abtument is located within said cavity.

7. The structure as recited in claim 6 wherein said elongated member is a stud threaded at said one end and having a head at said other end, said head defines said abutment.

8. The structure as recited in claim 7 wherein said abutment surface on said other plunger is raised relative to said annular surface on said other plunger and extends into said cavity.

9. The structure is recited in claim 8 wherein a second retainer is provided which is similar in shape to said first named retainer, the opening of said second retainer receiving said threaded end of said stud therethrough, the annular flange of said second retainer operatively abuts said end surface of said one plunger, said one end of said first coil spring engages said annular flange of said second retainer, whereby said second retainer serves as the operable connection of said stud to said one plunger and said second coil spring additionally serves to engage said one plunger with said annular flange of said second retainer.

10. The structure as recited in claim 1 wherein means are provided for adjusting the distance said elongated member extends from said one piston.

11. The structure as recited in claim 8 wherein said stop means comprises a fixed annular sealing member located at the rear of said bore, said first plunger has a flanged portion engaging said annular sealing member.

References Cited in the file of this patent
UNITED STATES PATENTS

| | | |
|---|---|---|
| 1,943,886 | Carroll | Jan. 16, 1934 |
| 2,157,733 | Sessions | May 9, 1939 |
| 2,194,816 | Van Vsetraut et al. | Mar. 26, 1940 |
| 2,347,239 | Berno | Apr. 25, 1944 |

FOREIGN PATENTS

| | | |
|---|---|---|
| 488,771 | Great Britain | July 13, 1938 |
| 590,897 | Great Britain | July 31, 1947 |
| 1,045,724 | France | July 1, 1953 |

OTHER REFERENCES

German printed application, 1,048,169, printed Dec. 31, 1958.